United States Patent
Deng (10) Patent No.: US 10,963,993 B2
(45) Date of Patent: Mar. 30, 2021

(54) IMAGE NOISE INTENSITY ESTIMATION METHOD, IMAGE NOISE INTENSITY ESTIMATION DEVICE, AND IMAGE RECOGNITION DEVICE

(71) Applicant: AutoChips Inc., Hefei (CN)

(72) Inventor: Licong Deng, Hefei (CN)

(73) Assignee: AUTOCHIPS INC., Hefei (CN)

( * ) Notice: Subject to any disclaimer, the term of this patent is extended or adjusted under 35 U.S.C. 154(b) by 63 days.

(21) Appl. No.: 16/508,330

(22) Filed: Jul. 11, 2019

(65) Prior Publication Data

US 2020/0118248 A1  Apr. 16, 2020

(30) Foreign Application Priority Data

Oct. 15, 2018 (CN) .......................... 201811196615.0

(51) Int. Cl.
*G06T 5/00* (2006.01)
*G06K 9/40* (2006.01)
*G06T 7/13* (2017.01)
*G06T 5/40* (2006.01)
*G06T 5/50* (2006.01)

(52) U.S. Cl.
CPC ................ *G06T 5/002* (2013.01); *G06T 5/40* (2013.01); *G06T 5/50* (2013.01); *G06T 7/13* (2017.01); *G06T 2207/20021* (2013.01)

(58) Field of Classification Search
None
See application file for complete search history.

(56) References Cited

U.S. PATENT DOCUMENTS

2016/0212363 A1* 7/2016 Kim ...................... G06T 5/002

FOREIGN PATENT DOCUMENTS

| CN | 102346909 A | 2/2012 |
| CN | 104134191 A | 11/2014 |
| CN | 107230208 A | 10/2017 |
| EP | 3046072 A1 | 7/2016 |

OTHER PUBLICATIONS

The First Office Action for The Chinese Application No. 201811196615.0 dated Mar. 16, 2020(9 pages).

* cited by examiner

*Primary Examiner* — Randolph I Chu (57) ABSTRACT

An image noise intensity estimation method, an image noise intensity estimation device, and an image recognition device are disclosed. The method includes: obtaining a first image to be estimated; filtering the first image to obtain a second image; dividing the first and second images to obtain a plurality of first image sub-blocks and a plurality of second image sub-blocks respectively; calculating error values between the first image sub-blocks and the second image sub-blocks in corresponding positions; and estimating the noise intensity of the first image according to a plurality of error values obtained by calculation. The method can improve the accuracy of noise estimation.

13 Claims, 5 Drawing Sheets using historical noise intensity to perform smooth filtering for current noise intensity obtained by calculation — 51 weighted-summing the historical noise intensity and the current noise intensity obtained by calculation — 52

IMAGE NOISE INTENSITY ESTIMATION METHOD, IMAGE NOISE INTENSITY ESTIMATION DEVICE, AND IMAGE RECOGNITION DEVICE

CROSS-REFERENCE TO RELATED APPLICATIONS

This application claims priority to Chinese Patent Application No. 201811196615.0, filed on Oct. 15, 2018, the contents of which are herein incorporated by reference in their entireties.

TECHNICAL FIELD

The present disclosure relates to the field of image processing technologies, and in particular, to an image noise intensity estimation method, an image noise intensity estimation device, and an image recognition device.

BACKGROUND

Many computer vision algorithms can obtain better processing results by setting parameters according to characteristics of processed images, and one of important features of images is image noise intensity. Obtaining image noise intensity is an important step for many image processing algorithms, such as image denoising, image edge detection, image segmentation, feature extraction, target recognition, and so on. For natural images captured by cameras, noise of the images is often unknown due to the effect of the intensity of the light and the capture devices, so the noise intensity of the images needs to be estimated.

With the development of image processing technology, many noise estimation methods have emerged. Existing noise estimation methods can be roughly classified into the following three categories: noise model-based methods, transform domain-based methods, and image sub-block-based methods. A noise model-based method establishes a probability model for image noise, and estimates the degree of noise based on the probability distribution. A transform domain-based method mainly includes singular value decomposition and wavelet transform, and estimates the noise intensity by transforming the image in the domain. An image sub-block-based divides an entire image into multiple sub-blocks, and selects smooth image sub-blocks to estimate the noise intensity.

Inventors of the present disclosure have found in long-term research and development that the existing image noise estimation methods have drawbacks. In many complicated systems, it is difficult for the noise to ideally conform to a certain probability distribution or it is impossible to acquire any prior knowledge about noise in advance. Therefore, a noise model-based estimation method sometimes differs greatly from real values; for a transform domain-based method, when an image contains more texture and edge information, the noise characteristics are greatly affected by the texture and edge characteristics, thereby affecting the accuracy of the method; an image sub-block-based noise estimation method needs to select smooth sub-blocks from image sub-blocks to estimate noise.

Image sub-block-based noise estimation methods can be classified into methods based on front and back frames and methods based on a single frame. Since moving pixel areas exist in front and back frames, methods based on front and back frames will affect the estimation accuracy of the noise intensity. Selecting a motion detection module to screen out the image still region is a feasible solution, but it is difficult to ensure the accuracy of motion detection, and the difficulty of subsequent calculation processing may also be increased.

SUMMARY

The main problem to be solved by the present disclosure is to provide an image noise intensity estimation method, a storage medium, and processing and identification devices, which can improve the accuracy of noise estimation.

In order to solve the above technical problem, a technical solution adopted by the present disclosure is to provide an image noise intensity estimation method, the method comprises: obtaining a first image to be estimated; filtering the first image to obtain a second image; dividing the first and second images to obtain a plurality of first image sub-blocks and a plurality of second image sub-blocks respectively; calculating error values between the first image sub-blocks and the second image sub-blocks in corresponding positions; and estimating the noise intensity of the first image according to a plurality of error values obtained by calculation.

In order to solve the above technical problem, another technical solution adopted by the present disclosure is to provide an image noise intensity estimation device, the device comprises: an obtaining unit, a filter, and a sub-block division and calculation unit; wherein, the obtaining unit is connected with the filter, the obtaining unit is configured to obtain a first image to be estimated, the filter is configured to filter the first image to obtain a second image; the sub-block division and calculation unit is connected with the filter, the sub-block division and calculation unit is configured to: divide the first and second images to obtain a plurality of first image sub-blocks and a plurality of second image sub-blocks respectively; calculate error values between the first image sub-blocks and second image sub-blocks in corresponding positions; and estimate the noise intensity of the first image according to a plurality of error values obtained by calculation.

In order to solve the above technical problem, another technical solution adopted by the present disclosure is to provide an image recognition device, the device comprises an input unit, an image division unit, a characteristic detection unit, and an output unit connected in sequence; the input unit is configured to input an image and noise intensity of the image, the image division unit is configured to adjust parameters in an image division algorithm according to the noise intensity, the characteristic detection unit is configured to adjust parameters in a characteristic detection algorithm according to the noise intensity, the output unit is configured to output a characteristic detection result.

Through the above solutions, beneficial effects of the present disclosure are as below: adopting a single-framed image to estimate noise intensity, first, using a filtering method to filter noise in a first image to be estimated to obtain a second image; dividing the first and second images to obtain a plurality of first image sub-blocks and a plurality of second image sub-blocks respectively: obtaining error values between the first image sub-blocks and the second image sub-blocks, and thus estimating the noise intensity of the first image according to the error values: since the noise intensity is estimated using the single-framed image, effect of motion factors on the estimation accuracy, which is caused by using front and rear frames to estimate noise intensity, is avoided, and the accuracy of noise estimation is improved.

BRIEF DESCRIPTION OF THE DRAWINGS

In order to describe the technical solutions in the embodiments of the present disclosure more clearly, the following will briefly introduce the accompanying drawings required for describing the embodiments. Apparently, the accompany drawings in the following description show merely some embodiments of the present disclosure, and one of ordinary skill in the art may still derive other drawings from these accompanying drawings without creative efforts. In the drawings.

DETAILED DESCRIPTION

A clear and complete description of the technical solutions in the embodiments of the present disclosure will be made below with reference to the accompanying drawings in the embodiments of the present disclosure. Apparently, the embodiments as recited herein are merely some embodiments of the present disclosure instead of all embodiments. All other embodiments obtained by one of ordinary skill in the art based on the embodiments of the present disclosure without creative efforts shall fall within the protection scope of the present disclosure.

Figure 1:
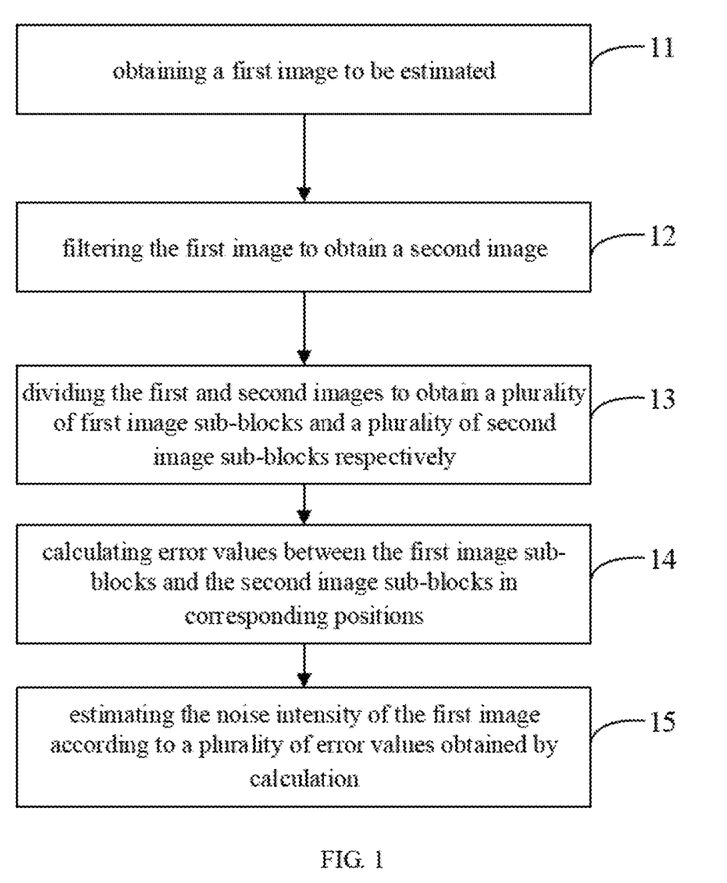
FIG. 1 is a schematic flow chart of an embodiment of an image noise intensity estimation method provided by the present disclosure.

Referring to FIG. 1, FIG. 1 is a schematic flow chart of an embodiment of an image noise intensity estimation method provided by the present disclosure, the method comprises:

Step 11: obtaining a first image to be estimated.

First, a first image to be estimated is obtained. The first image can be a color image, a grayscale image, a depth image, and so on.

Step 12: filtering the first image to obtain a second image.

After obtaining the first image, the first image is demised by using a filtering method to obtain a second image with reduced noise; wherein, the filtering method may be median filtering, mean filtering, wavelet filtering, bilateral filtering, or the like.

In a specific embodiment, since bilateral filtering filters the pixels from the spatial domain and the value domain and thus can better preserve edge and texture information of the image, the first image is bilaterally filtered. In particular, bilateral filtering can mitigate spatial filtering of edges and textures, thereby litigating effect of textures and edges on noise estimation.

Dividing the first image and the second image to obtain a plurality of first image sub-blocks and a plurality of second image sub-blocks respectively.

The first image and the second image are divided respectively to obtain a plurality of first image sub-blocks and a plurality of second image sub-blocks; the first image and the second image are in the same size, and the first image sub-block is equal in size to the second image sub-block in a corresponding position.

Figure 2:
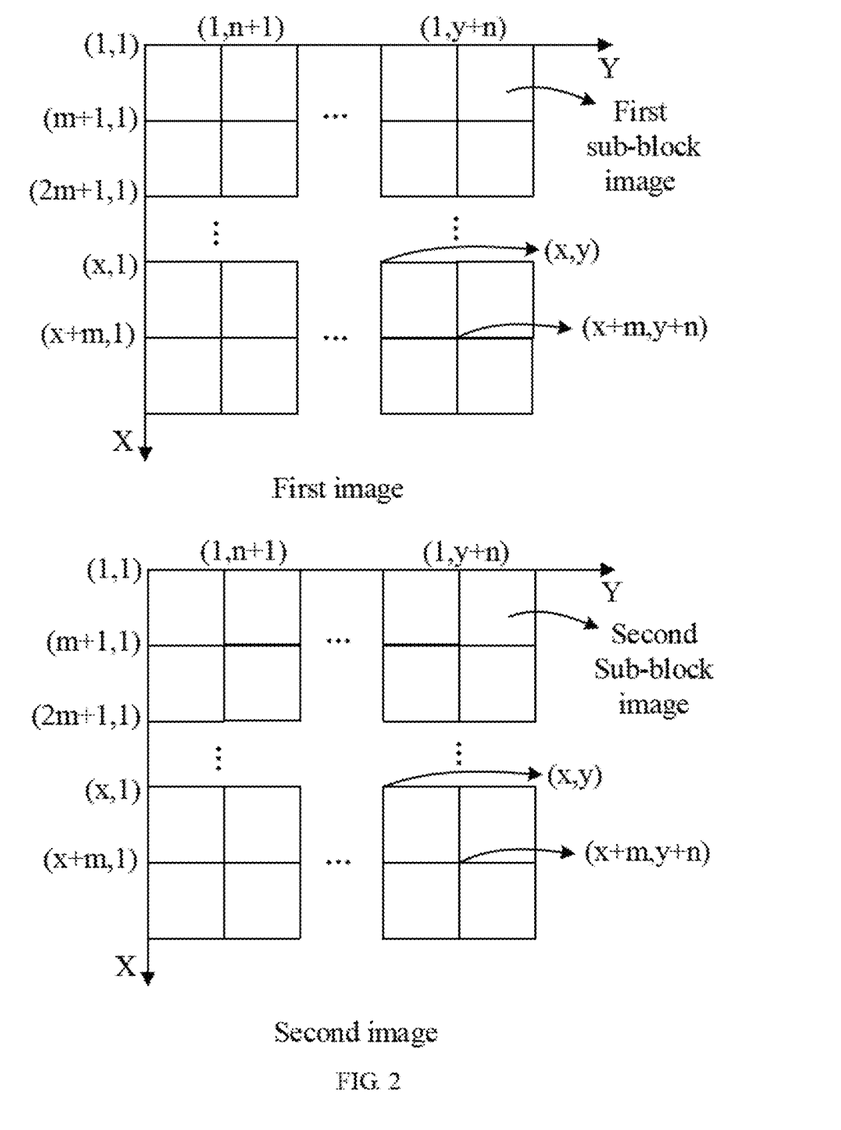
FIG. 2 is a schematic view of division of a first image and a second image of an embodiment of an image noise intensity estimation method provided by the present disclosure.

For example, as shown in FIG. 2, the first image and the second image are respectively divided into a plurality of first image sub-blocks and a plurality of second image sub-blocks, each first image sub-blocks includes m×n pixels, the first image sub-blocks and the second image sub-blocks are in the same size, and have the same position coordinates.

Step 14: calculating error values between the first image sub-blocks and the second image sub-blocks in corresponding positions.

With respect to each first image sub-block and the second image sub-block in a corresponding position, a pixel value difference between a first pixel in the first image sub-block and a second pixel corresponding in position to the first pixel in the second image sub-block in the corresponding position is calculated, and an error value is calculated according to the pixel value difference.

Further, the error value can be estimated by calculating a mean absolute error (MAE), sum of squared differences (SAD), a mean absolute difference (MAD), a mean squared error (MSE), a peak signal to noise ratio (PSNR) or a structural similarity (SSIM).

In a specific embodiment, since MAE can better reflect an actual situation of an error, MAE is used to estimate the error value. A calculation formula is as follows:

$$MAE(x, y) = \frac{1}{m \times n} \sum_{i=0}^{m-1} \sum_{j=0}^{n-1} |Y(x+i, y+j) - Y'(x+i, y+j)|$$

Wherein, x and y are respectively pixel coordinates in an X axis coordinate direction and a Y axis coordinate direction of the first image and the second image, MAE (x, y) is a mean absolute error between first image sub-blocks and second image sub-blocks with original coordinates x and y, m and n are respectively the numbers of the first image sub-blocks and of the second image sub-blocks in the X axis coordinate direction and in the Y axis coordinate direction, Y (x+i, y+j) represents a pixel value of a pixel in the first image of which coordinates are x+i and y+j, and Y' (x+i, y+j) represents a pixel value of a pixel in the second image of which coordinates are x+i and y+j.

Each first image sub-block and each second image sub-block correspond to an MAE, that is, with respect to a first image and a second image of which the numbers of the first image sub-blocks and of the second image sub-blocks are $N_{block}$, there is $N_{block}$ MAE in total.

Step S15: estimating the noise intensity of the first image according to a plurality of error values obtained by calculation.

In one embodiment, after obtaining the error value of each image sub-block, a variance of the noise can be approximately estimated by calculating an average value of the error values of all sub-blocks.

However, since noise distribution and edge information distribution may cause the error values of the image sub-blocks to be irregular, error values of image sub-blocks containing much edge and texture information should not be used as references for noise estimation. Therefore, calculating an average value cannot accurately represent the noise variance.

Therefore, in another embodiment, histogram statistics is performed for the obtained error values of the plurality of first image sub-blocks and of the plurality of second image sub-blocks, and the noise intensity of the first image is estimated according to error values corresponding to a histogram peak value.

Further, the plurality of error values are divided into a plurality of segments, the number of error values falling within each segment is counted respectively, and a segment in which the number of falling error values is the most is used as a histogram peak value.

Figure 4:
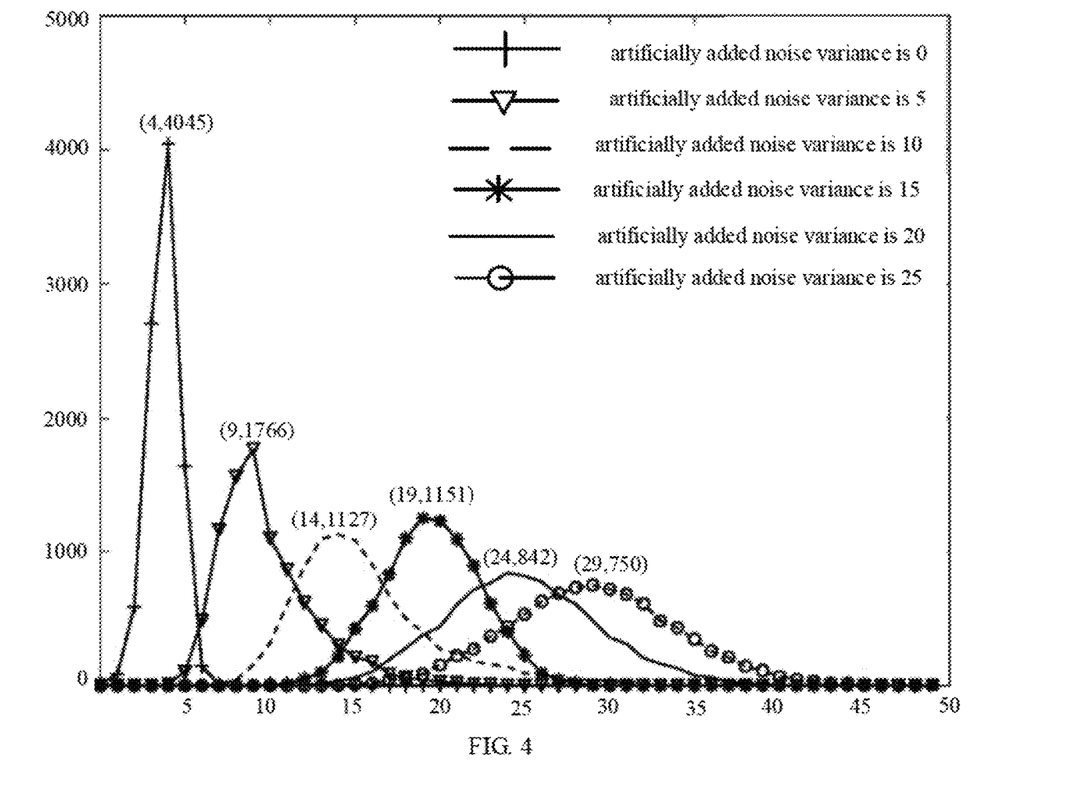
FIG. 4 is a histogram of an embodiment an image noise intensity estimation method provided by the present disclosure.

In particular, the abscissa of the histogram is the error value, and the ordinate of the histogram is the number of the first image sub-blocks corresponding to the error value.

After dividing the first image into m×n first image sub-blocks, most of the first image sub-blocks belong to smoothing sub-blocks, that is, pixel values in such a first image sub-block are relatively close, and a few first image sub-blocks are image edge sub-blocks, that is, such a first image sub-block contains edge pixel points. The smoother the first image sub-block, the less the influence of the edge on variation of the filtered pixel value, and the more suitable to represent the intensity of image noise. In order to use an error value of an effective image smooth sub-block as a reference sample for noise intensity estimation, in this embodiment, according to the created histogram, the histogram is analyzed to obtain the image noise intensity.

The present embodiment estimates based on a single frame image, is not affected by moving pixels, and uses bilateral filtering to avoid the influence of texture and edge information. Therefore, after obtaining the histogram, the possibility of the occurrence of multiple histogram peaks is very small, and thus the error value corresponding to the peak value can be selected as the estimated noise intensity. Here, the interval minimum value, the maximum value, the median value, or other values of the interval corresponding to the histogram peak value may be selected as the estimated noise intensity, or the average value of the error values falling within the interval may also be used as the estimated noise intensity.

Figure 3:
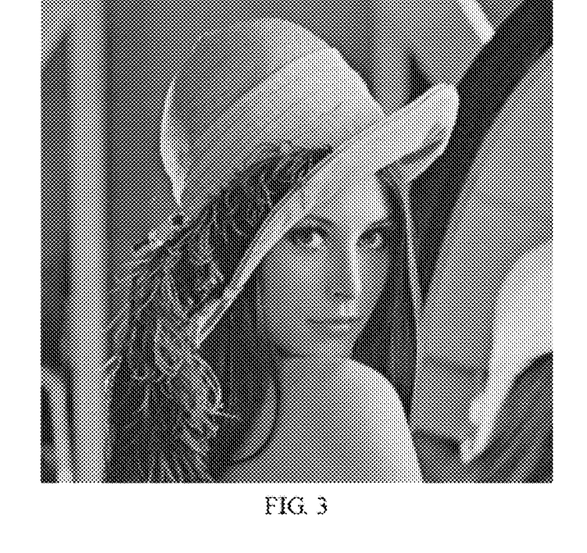
FIG. 3 is a first image of an embodiment of an image noise intensity estimation method provided by the present disclosure.

In a specific embodiment, the image shown in FIG. 3 is taken as the original image. In a condition that no noise is artificially added, as shown in FIG. 4, the noise intensity of the original image obtained by using the present scheme to estimate is 4, which indicates that the original image has a certain degree of noise and the noise intensity is about 4. Further, Gaussian noise is artificially added into the original image, wherein a variance of the added noise is {5, 10, 15, 20, 25}, respectively, and five noise images with different noise levels (i.e., the first image) can be obtained respectively. The method in this embodiment is used to perform noise intensity estimation, the estimated noise intensity result is shown in FIG. 4, the result is {9, 14, 19, 24, 29}. The noise estimation result of the original image is subtracted from this result, it can be obtained that the intensity of the artificially added noise is {5, 10, 15, 20, 25} respectively, which is consistent with the variance of the artificially added Gaussian noise, and thus accurate estimate for the noise intensity of the first image is realized.

After obtaining the noise intensity of the first image, parameters in an image processing algorithm can be adjusted according to the noise intensity. The parameters in the image processing algorithm can include filtering parameters in a filtering algorithm and/or edge detection parameters in an edge detection algorithm. In particular, the filtering parameters in the filtering algorithm are adjusted according to the noise intensity to enhance the filtering effect and reduce noise in the first image; or the edge detection parameters in the edge detection algorithm are adjusted according to the noise intensity to improve the edge detection result of the first image; moreover, parameters of an image division algorithm and of a characteristic detection algorithm in an image recognition algorithm can also be adjusted according to the noise intensity to improve the accuracy of the image recognition algorithm.

Since the noise intensity is estimated by using a single image, there is no effect of moving pixels, such that the obtained noise intensity is more accurate, and more reasonable parameters can be set for subsequent image processing, thereby obtaining more accurate processing effect. Furthermore, the present embodiment uses bilateral filtering and histogram statistics to perform filtering and noise estimation, so that the pixel difference between the first image sub-block and the second image sub-block obtained by calculation includes less image edge and texture information, which is advantageous to further estimate the image noise intensity; and after obtaining the error value between the first image sub-block and the second image sub-block, the histogram is used to estimate the noise image, it can be avoided that the first image sub-block contains irregular texture and edge information and affects the accuracy of noise estimation.

Figure 5:
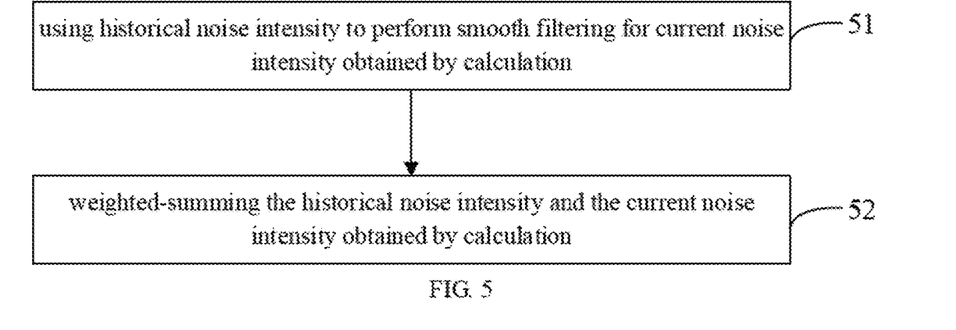
FIG. 5 is a schematic flow chart of another embodiment of an image noise intensity estimation method provided by the present disclosure.

Referring to FIG. 5, FIG. 5 is a schematic flow chart of another embodiment of an image noise intensity estimation method provided by the present disclosure, the image noise intensity estimation method of this embodiment includes the following steps:

Step 51: using historical noise intensity to perform smooth filtering for current noise intensity obtained by calculation.

When the noise intensity changes rapidly in the time domain, using only the current noise intensity as the estimated noise intensity may cause a large difference of the noise intensity estimated based on some successive image frames. If the noise intensity is used to guide the next image processing, it will result in a large difference in processing intensity, which is easy to be perceived by human's eyes, that is, causes an artificial visual effect. In order to avoid the artificial visual effect caused by the too fast switching of the noise intensity, the present embodiment uses the historical noise intensity to perform smooth filtering for the current noise intensity obtained by calculation.

First, historical noise intensity is obtained by the method in the above embodiment, and the historical noise intensity and the current noise intensity obtained by calculation are weighted-summed. In particularly, the following formula is adopted to obtain noise intensity of a current frame image:

$$\sigma_n^{-2} = a_{n-h} \times \sigma_{n-h}^2 + \Lambda + a_{n-1} \times \sigma_{n-1}^2 + + a_n \times \sigma_n^2$$

Wherein, the number h of the historical noise is larger than 1, $\{a_{n-h}, \Lambda\ a_{n-2}, a_{n-1}, a_n\}$ are filtering coefficients (i.e., weighting proportions). In actual implement, h and $\{a_{n-h}, \Lambda\ a_{n-2}, a_{n-1}, a_n\}$ can be set according to application scenarios and user's hobbies. A sum value of weighting proportions corresponding to the historical noise intensity and the current noise intensity obtained by calculation is 1, that is, $$\sum_{i=0}^{h} a_{n-i} = 1;$$

$\sigma_n^2$ is the current noise intensity obtained by calculation acquired according to the method of the above embodiment, and $\sigma_n^{-2}$ is smoothed noise interim.

Since the noise intensity of the current image is the most relevant to the current image, in a specific embodiment, the weighting proportion corresponding to the current noise intensity obtained by calculation is greater than the weighting proportion corresponding to the historical noise intensity.

Step S52: storing smoothly filtered noise intensity as the historical noise intensity.

After obtaining the noise intensity of the current image frame, in order to calculate noise intensity of a next frame of image, the noise intensity of the current image frame can be stored as historical noise intensity of the next frame of image.

Based on estimated historical noise intensity, the current image frame is smoothly filtered, and the filtered noise intensity is used as finally estimated current noise intensity; at the same time, the noise intensity is stored to be used as historical noise intensity for noise intensity estimation of a next frame of image. For the situation that noise intensity has a rapid change in the time domain, noise intensity can be estimated accurately.

Figure 6:
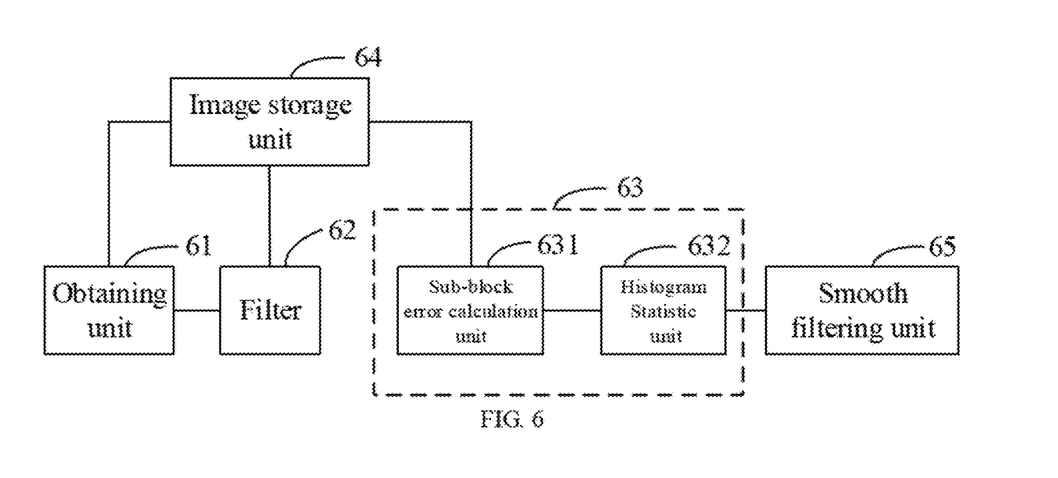
FIG. 6 is a structural schematic view of an embodiment of an image noise intensity estimation device provided by the present disclosure.

Referring to FIG. 6 FIG. 6 is a structural schematic view of an embodiment of an image noise intensity estimation device provided by the present disclosure, the image noise intensity estimation device comprises an obtaining unit 61, a filter 62, and a sub-block division and calculation unit 63.

The obtaining unit 61 is connected with the filter 62, and the obtaining unit 61 is configured to obtain a first image to be estimated. The obtaining unit 61 can be a surveillance camera, a traffic recorder, a reversing rear view, etc.

The filter 62 is configured to filter the first image to obtain a second image. A median filter, a mean filter, or a bilateral filter can be adopted to filter. In a specific embodiment, a bilateral filter is used to filter noise in the first image and thereby obtain a second image with reduced noise.

The sub-block division and calculation unit 63 includes a sub-block error calculation unit 631 and a histogram statistic unit 632 connected with each other.

The sub-block error calculation unit 631 is configured to divide the first image and the second image to obtain a plurality of first image sub-blocks and a plurality of second image sub-blocks respectively, and calculate error values between the first image sub-blocks and the second image sub-blocks in corresponding positions; wherein, the first image and the second image are in the same size, and the first image sub-block is equal in size to the second image sub-block in a corresponding position.

Further, the sub-block error calculation unit 631 is configured to: with respect to each first image sub-block and the second image sub-block in a corresponding position, calculate a pixel value difference between a first pixel in the first image sub-block and a second pixel corresponding in position to the first pixel in the second image sub-block in the corresponding position, and calculate an error value according to the pixel value difference. After the sub-block error calculation unit 631 calculates an error value, the error value is input into the histogram static unit 632 for histogram accumulation.

The histogram statistic unit 632 is configured to estimate the noise intensity of the first image according to a plurality of error values obtained by calculation.

Further, the histogram statistic unit 632 performs histogram statistic for obtained error values of the plurality of first image sub-blocks and the plurality of second image sub-blocks, and estimates the noise intensity of the first image according to the error value corresponding to a histogram peak value.

In particular, after the histogram statistic unit 632 receives an error value between a first image sub-block and a second image sub-block, the error value is added into a histogram. When error values between all first image sub-blocks and all second image sub-blocks are all calculated, the histogram is calculated, an error value corresponding to a histogram peak value is output as currently estimated noise intensity, and thus the estimation for the noise intensity is completed.

By using the bilateral filter to obtain the second image obtained after the first image is filtered, the pixel difference value between the first image sub-block and the second image sub-block obtained by calculation contains less image edge and texture information, which is advantageous to further estimation for the image noise intensity. By using the sub-block error calculation unit 631 to obtain the error values of the pixel difference values between the first image sub-blocks and the second image sub-blocks, and using the histogram statistics unit 632 to estimate the noise image, it can be avoided that the accuracy of noise estimation is affected due to irregular texture and edge information contained in the first image sub-blocks. Additionally, since the noise intensity is estimated using a single frame image, there is no effect of moving pixels, such that the obtained noise intensity is more accurate.

Continue to refer to FIG. 6, the image noise intensity estimation device further includes an image storage unit 64 and a smooth filtering unit 65, the image storage unit 64 are connected with the obtaining unit 61, the filter 62, and the sub-block error calculation unit 631 respectively, the image storage unit 64 is configured to store the first image and the second image; the smooth filtering unit 65 is connected with the histogram statistics unit 632, and is configured to perform smooth-filtering for the first image according to estimated noise intensity and use obtained filtered noise intensity as finally estimated noise intensity; in a specific embodiment, the smooth filtering unit 65 is a bilateral filter; additionally, with respect to videos, the noise intensity can be used as reference historical noise intensity for noise intensity estimation of a next frame of image.

The device in this embodiment can estimate noise intensity of images accurately, and can be applied in application scenarios such as rear view, panoramic splicing, automatic driving, etc.

With respect to rear view, after using a camera to capture a video, the device in this embodiment can be used to obtain noise intensity and obtain better denoising effect, and the quality of the finally displayed video will be improved.

With respect to panoramic splicing, video frames captured at the same time by a plurality of cameras will be spliced, the splicing algorithm will perform processing such as image edge detection and image texture information extraction for each video frame, and can use the estimated noise intensity obtained by the device in this embodiment to set parameters, such that the image characteristic extraction is more accurate, and the final image splicing effect is improved.

With respect to automatic driving, autopilot technology needs to detect and identify surrounding vehicles, persons and objects, and further predict behaviors of vehicles and persons to make action decisions. By the device in this embodiment, surrounding images can be captured to estimate the accurate noise intensity, which can be used to guide parameter setting of the image edge and contour detection algorithm, obtain more effective edge and contour information, improve the accuracy of recognition and behavior detection for vehicles and person, and ensure the correctness of action decision of automatic driving.

In a specific embodiment, the obtaining unit is a rearview camera, which is configured to input a video flow into the filter 62 and the image storage unit 64, the filter 62 is a bilateral filter.

After the bilateral filter obtains a currently input video frame (the first image), it performs bilateral filtering processing, sets filtering parameters [σs,σr] as [20, 40], wherein σs and σr are respectively spatial smoothing coefficient and value domain smoothing coefficient; in scenarios in which the input video has poor quality or light is dim, the value domain smoothing coefficient can be appropriately increased, for example, set to be [20, 80], and finally, a second image obtained by processing is stored into the image storage unit 64.

After completing storage of the second image, the sub-block error calculation unit 631 starts to read the first image and the second image in the image storage unit 64, and execute a calculation for sub-block error values. A size of an image sub-block is set into 5×5; with respect to an image with a small resolution, a size of an image sub-block can be set into 3×3. Every time a calculation for a sub-block error value is completed, it is input into the histogram statistics unit 632 to accumulate.

When reading the currently estimated noise intensity, the smooth filtering unit 65 executes a filtering calculation according to historical estimated noise intensity. In order to realize real time of noise estimation, two historical noise intensities are used, and corresponding filtering coefficients are {1/4,1/4,2/4}, such that noise changes can be traced at the same time of ensuring smooth updating, and finally the noise intensity estimation obtained after smooth filtering is used as the noise intensity of the current video frame.

In specific actual applications, in order to be able to process real-time input videos, the bilateral filter can be implemented by hardware, and the sub-block error calculation unit 631 and the histogram statistics unit 632 can be implemented by a GPU (Graphics Processing Unit) based on OPENCL (Open Computing Language) programming language, thereby completing acceleration for the calculation. The image storage unit 64 can be a DDR SDRAM (Double Data Rate Synchronous Dynamic Random Access Memory). The calculation amount of the smoothing filter unit 65 is small, and thus it can be programmed by software and complete calculation by a CPU (Central Processing Unit).

Figure 7:
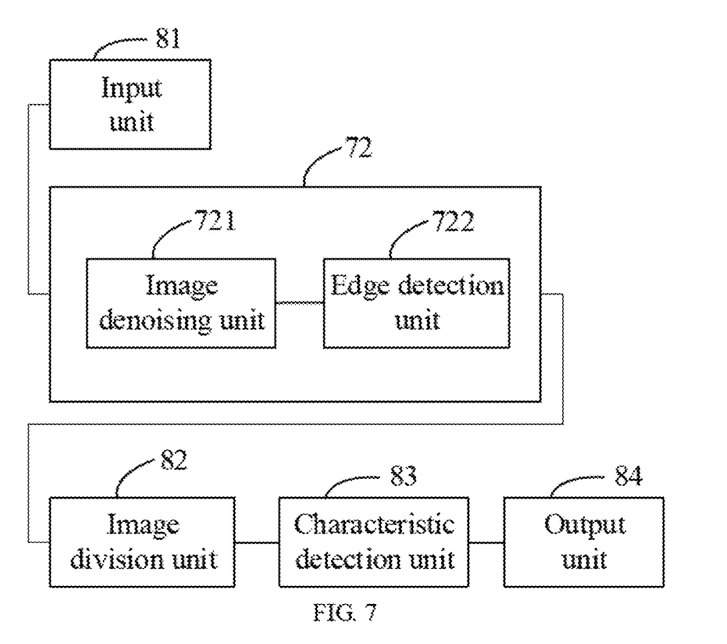
FIG. 7 is a structural schematic view of an embodiment of an image recognition device provided by the present disclosure.

Referring to FIG. 6 and FIG. 7, FIG. 7 is a schematic view of an embodiment of an image recognition device provided by the present disclosure. The image recognition device comprises an input unit 81, an image processing device, an image division unit 82, a characteristic detection unit 83, and an output device 84 connected in sequence. The input unit 81 is configured to input images and noise intensity of images. After the smooth filtering unit 65 obtains the noise intensity of the current frame, the noise intensity can be input into the image recognition device through the input unit 81, and then transmitted to the image processing device; the image processing device can adjust parameters in the image processing algorithm according to the estimated noise intensity, and thus obtain better processing effect.

In this embodiment, the input unit 81 can be configured to input both images and noise intensity of the images into image processing device, wherein, the noise intensity is noise intensity obtained by using the image noise intensity estimation device of the above embodiment.

The noise intensity input into the input unit 81 can then be transmitted to the image processing device. In this embodiment, the image processing device includes a processor 72, which includes an image denoising unit 721 and an edge detection unit 722, the image denoising unit 721 is configured to adjust filtering parameters in filtering algorithms according to noise intensity, the edge detection unit 722 is configured to adjust edge detection parameters in edge detection algorithms according to noise intensity.

It can be understood that, with respect to an image obtained by the input unit 81 and noise intensity of the image, they can be directly output into the image division unit 82 after being denoised by only the image denosing unit 721; or only the edge detection unit 722 is used to perform edge detection, and the processor 72 is directly used to output; or the image denoising unit 721 can also be firstly used to denoise, edge detection is performed for the filtered image, and finally the processor 72 is used to output.

In a specific embodiment, the image denosing unit 721 denoises using bilateral filtering, a value domain parameter σr can be adjusted and set according to estimated noise intensity $\sigma_n^{-2}$, that is, $\sigma_r = \rho \sigma_n^-$, ρ>0, and ρ is an adjusting parameter. The larger the noise intensity $\sigma_n^{-2}$, the larger the corresponding value domain filtering parameter $\sigma_r$, and the stronger the bilateral denosing effect, thereby obtaining better denosing effect. The edge detection unit 722 uses the Canny edge detection algorithm to detect edges of images, and uses double threshold value detection to determine real and potential edges of images. The double threshold value of the edge detection can be adjusted according to the estimated noise intensity $\sigma_n^{-2}$, when the image noise intensity increases, more interfering edges will be generated; increasing the double threshold value correspondingly according to the noise intensity $\sigma_n^{-2}$, the edge detection can eliminate the interfering edges caused by the noise, and thus obtain a more accurate edge detection result.

After using the image processing device to obtain an image with better image quality, the image with better image quality can be transmitted to the image division unit 82 and the characteristic detection unit 83, and the image recognition device can be used to perform image recognition.

During image recognition, the image division unit 82 is configured to adjust parameters in image division algorithms according to noise intensity, the characteristic detection unit 83 is configured to adjust parameters in characteristic detection algorithms according to noise intensity, and the output unit 84 is configured to output characteristic detection results. Results output by the output unit 84 can be transmitted to a display unit (not shown in the figures) to display, thereby completing real-time display of rearview images.

Wherein, the input images are images output by the image processing device (i.e., output by the processor 72), and the noise intensity is noise intensity obtained by the image noise intensity estimation device of the above embodiments.

Since an image recognition algorithm requires performing division, characteristic detection, and characteristic measurement calculation for object images, and implementing object identification through classification, on one hand, accurate noise intensity can optimize image deposing effect and improve image quality, such that results of image division and characteristic detection are more precise; and on the other hand, noise intensity can be used to guide parameter setting in image division algorithms and characteristic detection algorithm, such that characteristics are extracted more precisely, and finally accuracy of image recognition is improved.

By using the image noise intensity estimation device, noise intensity estimation can be performed for input videos, and be configured to further guide the image processing device and the image recognition device to process images. It can be used in image recognition of ADAS (Advanced Driver Assistant Systems) of automatic driving, and can also be applied in other image processing algorithms depending on noise intensity information; by adjusting parameters in filtering, edge detection, image division, and characteristic detection algorithms, better image processing effect is obtained, and finally image recognition accuracy is improved.

Figure 8:
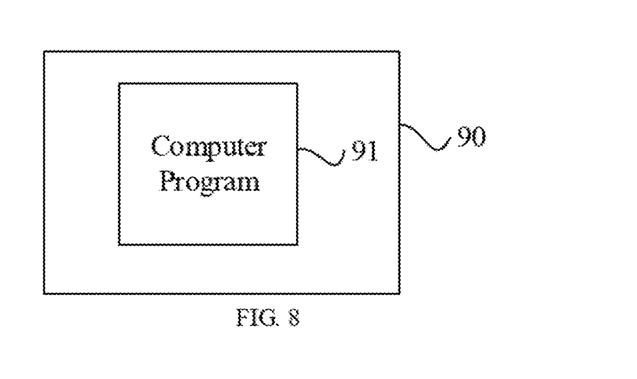
FIG. 8 is a structural schematic view of an embodiment of a storage medium provided by the present disclosure.

Referring to FIG. 8, FIG. 8 is a structural schematic view of an embodiment of a storage medium provided by the present disclosure, the storage medium 90 is configured to store a computer program 91; when being executed by a processor, the computer program 91 is configured to implement the method of the above embodiments.

The storage medium 90 can be various kinds of mediums that can store program codes, such as servers, U-disks, mobile hard disks, ROMs (Read-Only Memory), RAMs (Random Access Memory), disks, compact disks, etc.

In the several embodiments provided by the present disclosure, it should be understood that the disclosed method and apparatus may be implemented in other manners. For example, the device implementations described above are merely illustrative. For example, the division of modules or units is only a logical function division. In actual implementation, there may be another division manner, for example, multiple units or components may be combined or may be integrated into another system, or some features can be ignored or not executed.

The units described as separate components may be or may not be physically separated, and the components displayed as units may be or may not be physical units, that is, may be located in one place, or may be distributed to multiple network units. Some or all of the units may be selected according to actual requirements to achieve the purposes of the solutions of the present embodiments.

In addition, each functional unit in each embodiment of the present disclosure may be integrated into one processing unit, or each unit may exist physically separately, or two or more units may be integrated into one unit. The above integrated unit can be implemented in the form of hardware or in the form of a software functional unit.

The above are only the embodiments of the present disclosure, and thus do not limit the patent scope of the present disclosure. Equivalent structure or equivalent process transformations made by the contents of the specification and the drawings of the present disclosure, or directly or indirectly applications in other related technical fields, are all similarly included in the patent protection scope of the present disclosure.

What is claimed is:

1. An image noise intensity estimation method, comprising:
    obtaining a first image to be estimated;
    filtering the first image to obtain a second image;
    dividing the first and second images to obtain a plurality of first image sub-blocks and a plurality of second image sub-blocks respectively;
    calculating error values between the first image sub-blocks and the second image sub-blocks in corresponding positions; and
    estimating the noise intensity of the first image according to a plurality of error values obtained by calculation;
    wherein the image noise intensity estimation method further comprises:
    using historical noise intensity to perform smooth filtering for current noise intensity obtained by calculation; and weighted-summing the historical noise intensity and the current noise intensity obtained by calculation;
    wherein a summing value of weighting proportions corresponding to the historical noise intensity and to the current noise intensity obtained by calculation is 1, and the weighting proportion corresponding to the current noise intensity obtained by calculation is greater than the weighting proportion corresponding to the historical noise intensity.

2. The image noise intensity estimation method according to claim 1, wherein, calculating error values between the first image sub-blocks and the second image sub-blocks in corresponding positions includes:
    calculating a pixel value difference between a first pixel in a first image sub-block and a second pixel corresponding in position to the first pixel in a second image sub-block in a corresponding position, and calculating an error value according to the pixel value difference.

3. The image noise intensity estimation method according to claim 1, wherein, estimating the noise intensity of the first image according to a plurality of error values obtained by calculation includes:
    performing histogram statistics for the plurality of error values, and estimating the noise intensity of the first image according to error values corresponding to a histogram peak value.

4. The image noise intensity estimation method according to claim 3, wherein, performing histogram statistics for the plurality of error values, and estimating the noise intensity of the first image according to error values corresponding to a histogram peak value includes:
    dividing the plurality of error values into a plurality of segments, counting the number of error values falling within each segment respectively, and using a segment in which the number of falling error values is the most as a histogram peak value.

5. The image noise intensity estimation method according to claim 1, further comprising:
    storing smoothly filtered noise intensity as the historical noise intensity.

6. An image noise intensity estimation device, comprising:
    an obtaining unit, a filter, and a sub-block division and calculation unit;
    wherein, the obtaining unit is connected with the filter, the obtaining unit is configured to obtain a first image to be estimated, the filter is configured to filter the first image to obtain a second image; the sub-block division and calculation unit is connected with the filter, and the sub-block division and calculation unit is configured to: divide the first and second images to obtain a plurality of first image sub-blocks and a plurality of second image sub-blocks respectively; calculate error values between the first image sub-blocks and second image sub-blocks in corresponding positions; and estimate the noise intensity of the first image according to a plurality of error values obtained by calculations;
    wherein the sub-block division and calculation unit is further configured to weighted-sum the historical noise intensity and the current noise intensity obtained by calculation;
    wherein a summing value of weighting proportions corresponding to the historical noise intensity and to the current noise intensity obtained by calculation is 1, and the weighting proportion corresponding to the current noise intensity obtained by calculation is greater than the weighting proportion corresponding to the historical noise intensity.

7. The image noise intensity estimation device according to claim 6, wherein, the sub-block division and calculation unit is further configured to calculate a pixel value difference between a first pixel in a first image sub-block and a second pixel corresponding in position to the first pixel in a second image sub-block in a corresponding position, and calculate an error value according to the pixel value difference.

8. The image noise intensity estimation device according to claim 6, wherein, the sub-block division and calculation unit is further configured to perform histogram statistics for the plurality of error values, and estimate the noise intensity of the first image according to error values corresponding to a histogram peak value.

9. The image noise intensity estimation device according to claim 8, wherein, the sub-block division and calculation unit is further configured to divide the plurality of error values into a plurality of segments, count the number of error values falling within each segment respectively, and use a segment in which the number of falling error values is the most as a histogram peak value.

10. The image noise intensity estimation device according to claim 6, further comprising a smooth filtering unit configured to use historical noise intensity to perform smooth filtering for current noise intensity obtained by calculation.

11. The image noise intensity estimation device according to claim 6, further comprising a storage unit configured to store smoothly filtered noise intensity as the historical noise intensity.

12. An image recognition device, comprising an input unit, an image division unit, a characteristic detection unit, and an output unit connected in sequence;
wherein, the input unit is configured to input an image and noise intensity of the image, wherein the noise intensity is noise intensity obtained by the image noise intensity estimation device of claim 9; the image division unit is configured to adjust parameters in an image division algorithm according to the noise intensity, the characteristic detection unit is configured to adjust parameters in a characteristic detection algorithm according to the noise intensity, the output unit is configured to output a characteristic detection result.

13. The image recognition device according to claim 12, further comprising a processor; wherein, the processor includes an image denosing unit and/or an edge detection unit, the image denosing unit and/or the edge detection unit is/are connected between the input unit and the image division unit; the image denoising unit is configured to adjust filtering parameters in a filter algorithm according to the noise intensity, and the edge detection unit is configured to adjust edge detection parameters in an edge detection algorithm according to the noise intensity.

* * * * *